United States Patent
Mohapatra et al.

(10) Patent No.: US 10,952,479 B2
(45) Date of Patent: Mar. 23, 2021

(54) PROTECTION FOR HEAD MOUNTED DISPLAY DEVICE

(71) Applicant: SONY CORPORATION, Tokyo (JP)

(72) Inventors: Bibhudendu Mohapatra, San Diego, CA (US); Keith Resch, San Diego, CA (US); Fred Ansfield, San Diego, CA (US); Loren Pineda, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 196 days.

(21) Appl. No.: 16/141,066

(22) Filed: Sep. 25, 2018

(65) Prior Publication Data
US 2020/0093200 A1    Mar. 26, 2020

(51) Int. Cl.
G08B 21/00    (2006.01)
A41D 13/015    (2006.01)
A41D 13/05    (2006.01)
A42B 3/04    (2006.01)

(52) U.S. Cl.
CPC .......... *A41D 13/0155* (2013.01); *A41D 13/05* (2013.01); *A42B 3/042* (2013.01)

(58) Field of Classification Search
None
See application file for complete search history.

(56) References Cited

U.S. PATENT DOCUMENTS

| | | | |
|---|---|---|---|
| 9,713,756 B1* | 7/2017 | Tran | A63B 24/0006 |
| 2012/0102630 A1* | 5/2012 | Anderson | A42B 3/0486 |
| | | | 2/413 |
| 2016/0183607 A1* | 6/2016 | Lopez Yunez | A41D 13/0182/455 |
| 2017/0181485 A1* | 6/2017 | Jin | A41F 9/002 |
| 2018/0027894 A1* | 2/2018 | Bangera | A41D 1/00 |
| 2018/0028091 A1* | 2/2018 | Huang | A61F 5/3707 |
| 2018/0303190 A1* | 10/2018 | Calilung | A42B 3/185 |
| 2020/0096952 A1* | 3/2020 | Hu | A62B 35/0043 |
| 2020/0120405 A1* | 4/2020 | Awiszus | H04Q 9/00 |

FOREIGN PATENT DOCUMENTS

| | | |
|---|---|---|
| JP | 2004-233879 A | 8/2004 |
| JP | 2013-044830 A | 3/2013 |
| WO | 2010/067758 A1 | 6/2010 |
| WO | 2013/027752 A1 | 2/2013 |

* cited by examiner

*Primary Examiner* — Julie B Lieu
(74) *Attorney, Agent, or Firm* — Chip Law Group

(57) ABSTRACT

A head mounted display (HMD) device that includes a plurality of sensors, an actuator, a plurality of protective mechanisms, and a processor configured to identify a situational state of a user of the HMD device within a proximity of the user, based on sensor input received from the plurality of sensors. A risk-level of a potential injury to the user from a component of the HMD device is determined based on the identified situational state and the sensor input. A protective mechanism is selected from the plurality of protective mechanisms based on the identified situational state and the determined risk-level. The actuator is controlled to deploy the selected protective mechanism to mitigate injury to the user from the component of the HMD device, based on the identified situational state and the determined risk-level.

20 Claims, 8 Drawing Sheets

PROTECTION FOR HEAD MOUNTED DISPLAY DEVICE

CROSS-REFERENCE TO RELATED APPLICATIONS/INCORPORATION BY REFERENCE

None.

FIELD

Various embodiments of the disclosure relate to wearable technologies. More specifically, various embodiments of the disclosure relate to a protective system and method for a head mounted display (HMD) device.

BACKGROUND

Recent advancements in the field of wearable technologies and display systems have led to the development of various HMD devices. Although the usage of the HMD devices have increased, however, technologies related to physical safety of a wearer of the HMD device from the HMD device itself are at a nascent stage. In certain scenarios, for example, during an accident, certain components of a HMD device may cause an injury to sensitive body parts, such as the eyes, to the wearer of the HMD device. Thus, an advanced protective system may be desirable for a HMD device to protect or at least minimize injury to eye or other sensitive body parts of the wearer of the HMD device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A protective system and method for a head mounted display (HMD) device, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
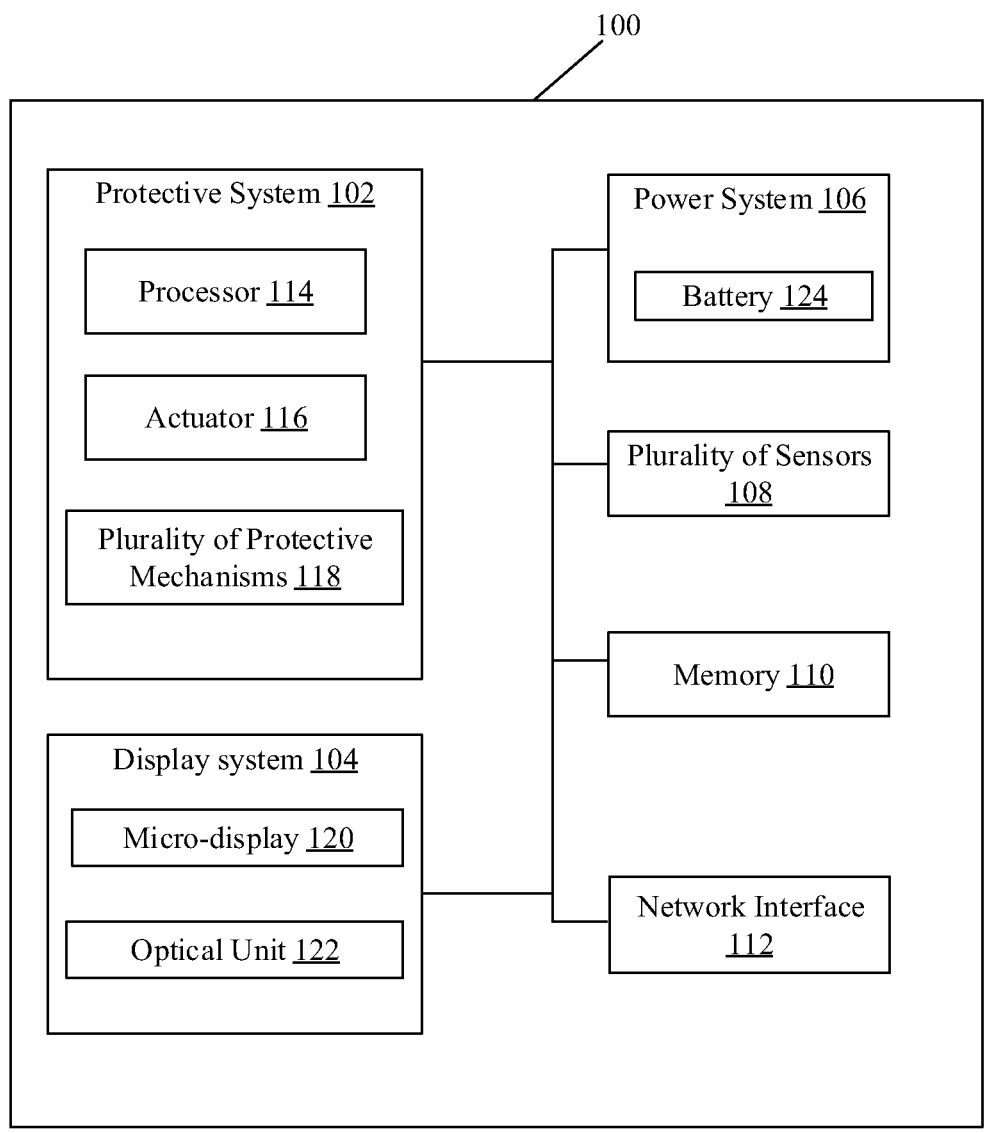
FIG. 1 is a block diagram that illustrates an exemplary head mounted display (HMD) device with a protective system, in accordance with an embodiment of the disclosure.

Various implementations may be found in a protective system and method for a head mounted display (HMD) device. The disclosed protective system and method protects or minimizes injury to eye or other sensitive body parts of the wearer of the HMD device in various scenarios. Exemplary aspects of the disclosure may comprise a method implemented in the HMD device, which includes identification of a situational state of a user of the HMD device within a proximity of the user. The situational state may be identified based on sensor input received from a plurality of sensors provided in the HMD device. The protective system of the HMD device may be configured to determine a risk-level of a potential injury to the user from a component of the HMD device, based on the identified situational state and the sensor input. The protective system may be configured to select a protective mechanism from a plurality of protective mechanisms provided in the protective system, based on the identified situational state and the determined risk-level. An actuator of the protective system may be controlled to deploy the selected protective mechanism to mitigate injury to the user from the component of the HMD device, based on the identified situational state and the determined risk-level.

In accordance with an embodiment, the plurality of protective mechanisms may include a retract mechanism. The protective system may be configured to control the actuator to retract the component of the HMD device by the retract mechanism to mitigate injury to the user from the component of the HMD device, based on the identified situational state and the determined risk-level. The component of the HMD device may correspond to an optical unit positioned to face at least one eye of the user.

In accordance with an embodiment, the plurality of protective mechanisms may include a customized airbag. The protective system may be configured to control the actuator to deploy the customized airbag to mitigate injury to the user from the component of the HMD device, based on the identified situational state and the determined risk-level. In some embodiments, the plurality of protective mechanisms may include a tubular structure. The protective system may be configured to control the actuator to deploy the tubular structure to encompass the component of the HMD device to mitigate injury to the user from the component of the HMD device, based on the identified situational state and the determined risk-level. In some embodiments, the plurality of protective mechanisms may include a detachment mechanism. The protective system may be configured to control the actuator to detach the component from the HMD device by the detachment mechanism to mitigate injury to the user from the component of the HMD device, based on the identified situational state and the determined risk-level.

In accordance with an embodiment, the protective system may be configured to determine a direction of fall of the user towards a ground surface within the proximity of the user. The protective system may be configured to identify the situational state of the user as a fall-on-back state or a fall-on-face state on the floor surface, based on the determined direction of fall of the user. The protective system may be configured to control the actuator to deploy at least one of the customized airbag or the tubular structure to encompass the component of the HMD device to mitigate injury to the user from the component of the HMD device, based on the identification of the situational state as the fall-on-face state and the risk-level as a high risk-level greater than a threshold.

In accordance with an embodiment, the protective system may be configured to compute a distance between a moving object and the HMD device and a likelihood of a contact of the moving object with the HMD device, within the proximity of the user. The protective system may be configured to determine, whether to output a warning signal or control the actuator to deploy the selected protective mechanism, based on the computed distance between the moving object and the HMD device and the likelihood of the contact of the moving object with the HMD device. The warning signal may be generated further based on the situational state identified as a sports-play state and the risk-level determined as a medium-risk level. The risk-level may be determined as a medium-risk level based on a comparison of the computed distance and the likelihood of the contact of the moving object with the HMD device with one or more defined thresholds.

FIG. 1 is a block diagram that illustrates an exemplary head mounted display (HMD) device with a protective system, in accordance with an embodiment of the disclosure. With reference to FIG. 1, there is shown an exemplary HMD device, such as a HMD device 100. The HMD device 100 may include a protective system 102, a display system 104, a power system 106, a plurality of sensors 108, a memory 110, and a network interface 112. The protective system 102 may include a processor 114, an actuator 116, and a plurality of protective mechanisms 118. The display system 104 may include a micro-display 120 and an optical unit 122. The power system 106 may include a battery 124. The processor 114 may be communicatively coupled to the display system 104, the power system 106, the plurality of sensors 108, the memory 110, and the network interface 112.

The HMD device 100 may be a wearable display device that may be removably attached to various platforms, such as eyeglasses, helmets or other head mounted sportswear. The HMD device 100 when attached to a conventional or personal eyeglass transforms the eyeglass to a smart glass. The HMD device 100 may also be worn on the head of a human or as part of a helmet. Illustrative examples of the HMD device 100 are shown in the FIGS. 2, 3, and 4.

The protective system 102 may comprise suitable logic, interfaces, and/or code that may be configured to determine a risk-level of a potential injury to the user from a component, such as the optical unit 122, of the HMD device 100, based on the sensor input from the plurality of sensors 108 and identification of a situational state in the proximity of the user. The protective system 102 may include the processor 114, the actuator 116, and the plurality of protective mechanisms 118.

The processor 114 may be configured to identify a situational state of a user of the HMD device 100 within a proximity of the user, based on sensor input received from the plurality of sensors 108. The processor 114 may be configured to determine whether to deploy a protective mechanism of the plurality of protective mechanism 118 or not based on the identified situational state of the user of the HMD device 100 and the determined risk-level. In accordance with an embodiment, the processor 114 may execute a set of instructions stored in the memory 110. 204. Examples of the processor 114 may include, but are not limited to a microprocessor, a graphics processing unit (GPU), a Reduced Instruction Set Computing (RISC) processor, an Application-Specific Integrated Circuit (ASIC) processor, a Complex Instruction Set Computing (CISC) processor, and/or other special-purpose hardware processors or control circuitry.

The actuator 116 may comprise suitable logic, circuitry, interfaces, and/or code that may be configured to receive control signals from the processor 114. The actuator 116 may be configured to deploy one or more of the plurality of protective mechanisms 118 based on control signals received from the processor 114. The actuator 116 may draw energy from the power system 106 to move or control one or more of the plurality of protective mechanisms 118.

The plurality of protective mechanisms 118 may include a retract mechanism, a detachment mechanism, a customized airbag, a tubular structure, and/or a warning signal output. The plurality of protective mechanisms 118 are shown and described, for example, in FIG. 5.

The display system 104 may comprise suitable logic, circuitry, interfaces, and/or code that may be configured to display content visible via the optical unit 122. The display system 104 may comprise one or two micro-displays, such as the micro-display 120. The micro-display 120 may be an organic light-emitting diode (OLED) micro-display. Other examples of the micro-display 120 may include, but are not limited to micro liquid crystal display, micro light-emitting diode, Liquid Crystal on Silicon (LcoS)-based micro-display, ferroelectric liquid crystals-based micro-display, or other types of micro-display suitable for near-eye placement. The micro-display 120 may project visual information as an image to the user's eye visible through the optical unit 122.

The power system 106 may refer to power electronics of a specified size adapted to be integrated within a wearable device, such as the HMD device 100. The power system 106 may include the battery 124. The battery 124 refers to a rechargeable battery. Examples of the battery 124 may include, but are not limited to lithium ion (such as dual stack lithium ion), lead-acid, nickel cadmium (NiCd), nickel metal hydride (NiMH), and lithium ion polymer (Li-ion polymer) battery. In some embodiments, instead of a single battery, a plurality of batteries may be stacked. The stacking of batteries may provide a larger capacity due to the ability to store more power (energy) packed with more cells. For example, as the wearable devices, such as the HMD device 100 include more functionality, sensors, and applications, energy demand may increase to support these functionalities, sensors, and applications. Thus, the battery 124 may be support and power the different components of the HMD device 100.

The plurality of sensors 108 may comprise suitable logic, circuitry, interfaces, and/or code that may be configured to. The plurality of sensors 108 may include a time-of-flight (ToF) camera, a gyroscope, a location sensor, an accelerometer, and a microphone. In some embodiments, other sensors may be integrated as a sensor hub in the HMD device 100. Other examples of the plurality of sensors 108 may include, but are not limited to, a proximity sensor, an image sensor, a temperature sensor, a humidity sensor, or a smell sensor.

The memory 110 may comprise suitable logic, circuitry, interfaces, and/or code that may be configured to store content to be displayed by the display system 104. The memory 110 may be further configured to store instructions executable by the processor 114. The memory 110 may be further configured to store operating systems and associated applications of the display system 104. Examples of implementation of the memory 110 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The network interface 112 may comprise suitable logic, circuitry, interfaces, and/or code that may be configured to communicate with external electronic devices or server, via a communication network, such as a wireless local area network (WLAN), or Bluetooth. The network interface 112 may be implemented by application of known technologies to support wired or wireless communication of the HMD device 100 with the communication network. Components of the network interface 112 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. In some embodiments, the network interface 112 may also support communication to a cloud network, a Long Term Evolution (LTE) network, and/or the Internet, or variants thereof.

In operation, the processor 114 may be configured to identify a situational state of a user of the HMD device 100 within a proximity of the user. The HMD device 100 may be worn by the user. The situational state may be identified based on sensor input received from the plurality of sensors 108 provided in the HMD device 100.

For example, in a first situation, the user may fall down on a ground surface and the user's head may be about to hit the ground surface. The plurality of sensors 108, for example, a TOF camera, may continuously or periodically capture a plurality of images while the user may be falling down. Similarly, the plurality of sensors 108 may also sense a sudden change in an orientation of the HMD device 100 while the user may be falling down on the ground surface. Based on various sensor input from the plurality of sensors 108, the processor 114 may be configured to determine a direction of fall of the user towards the ground surface within the proximity of the user. The processor 114 may be further configured to identify the situational state of the user as a fall-on-back state, a sideward fall, or a fall-on-face state on the ground surface, based on the determined direction of fall of the user.

In a second situation, the user may be involved in a sports activity, for example, playing golf. Based on the sensor input from the plurality of sensors 108, the situational state in the second situation may be identified as a sports-play state. The processor 114 may be configured to monitor a moving object, such as a golf ball, in the proximity of the user of the HMD device 100 based on the sensor input from the plurality of sensors 108. The processor 114 may be configured to compute a distance between the moving object and the HMD device 100. The processor 114 may be further configured to compute a likelihood of a contact of the moving object, such as the golf ball, with the HMD device 100 worn by the user. If the likelihood of the contact is detected, the situational state may be updated to a potential impact state. The situational state may include, but is not limited to, the sports-play state, the fall-on-back state, the fall-on-face state, or the potential impact state.

The processor 114 may be configured to determine a risk-level of a potential injury to the user from a component, such as the optical unit 122, of the HMD device 100, based on the identified situational state and the sensor input. The component of the HMD device 100, such as the optical unit 122, may be positioned to face at least one eye of the user. Based on the identified situational state and sensor input from the plurality of sensors 108 in real time or near-real time, the risk-level that the component, such as the optical unit 122, may poke the user's eye, or the HMD device 100 may be potentially damaged, may be computed.

The processor 114 may be configured to select a protective mechanism from a plurality of protective mechanisms 118, based on the identified situational state and the determined risk-level. The plurality of protective mechanisms 118 may include a retract mechanism, a detachment mechanism, a customized airbag, a tubular structure, and/or a warning signal output.

The processor 114 may be configured to control the actuator 116 to deploy the selected protective mechanism to mitigate injury to the user from the component of the HMD device 100, based on the identified situational state and the determined risk-level. The processor 114 may be configured to control the actuator 116 to retract the component of the HMD device 100 by the retract mechanism to mitigate injury to the user from the component of the HMD device 100, based on the identified situational state and the determined risk-level. The processor 114 may be configured to control the actuator 116 to deploy the customized airbag to mitigate injury to the user from the component of the HMD device 100, based on the identified situational state and the determined risk-level.

The processor 114 may be configured to control the actuator to deploy the tubular structure to encompass the component of the HMD device 100 to mitigate injury to the user from the component of the HMD device 100, based on the identified situational state and the determined risk-level. The processor 114 may be configured to control the actuator 116 to detach the component from the HMD device 100 by the detachment mechanism to mitigate injury to the user from the component of the HMD device 100, based on the identified situational state and the determined risk-level.

The processor 114 may be configured to control the actuator to deploy at least one of the customized airbag or the tubular structure to encompass the component of the HMD device to mitigate injury to the user from the component of the HMD device, based on the identification of the situational state as the fall-on-face state and the risk-level as a high risk-level greater than a threshold. The processor 114 may be configured to determine, whether to output a warning signal or control the actuator to deploy the selected protective mechanism, based on the computed distance between the moving object and the HMD device and the likelihood of the contact of the moving object with the HMD device. The warning signal may be generated further based on the situational state identified as a sports-play state and the risk-level determined as a medium-risk level. The risk-level may be determined as a medium-risk level based on a comparison of the computed distance and the likelihood of the contact of the moving object with the HMD device with one or more defined thresholds.

Figure 2:
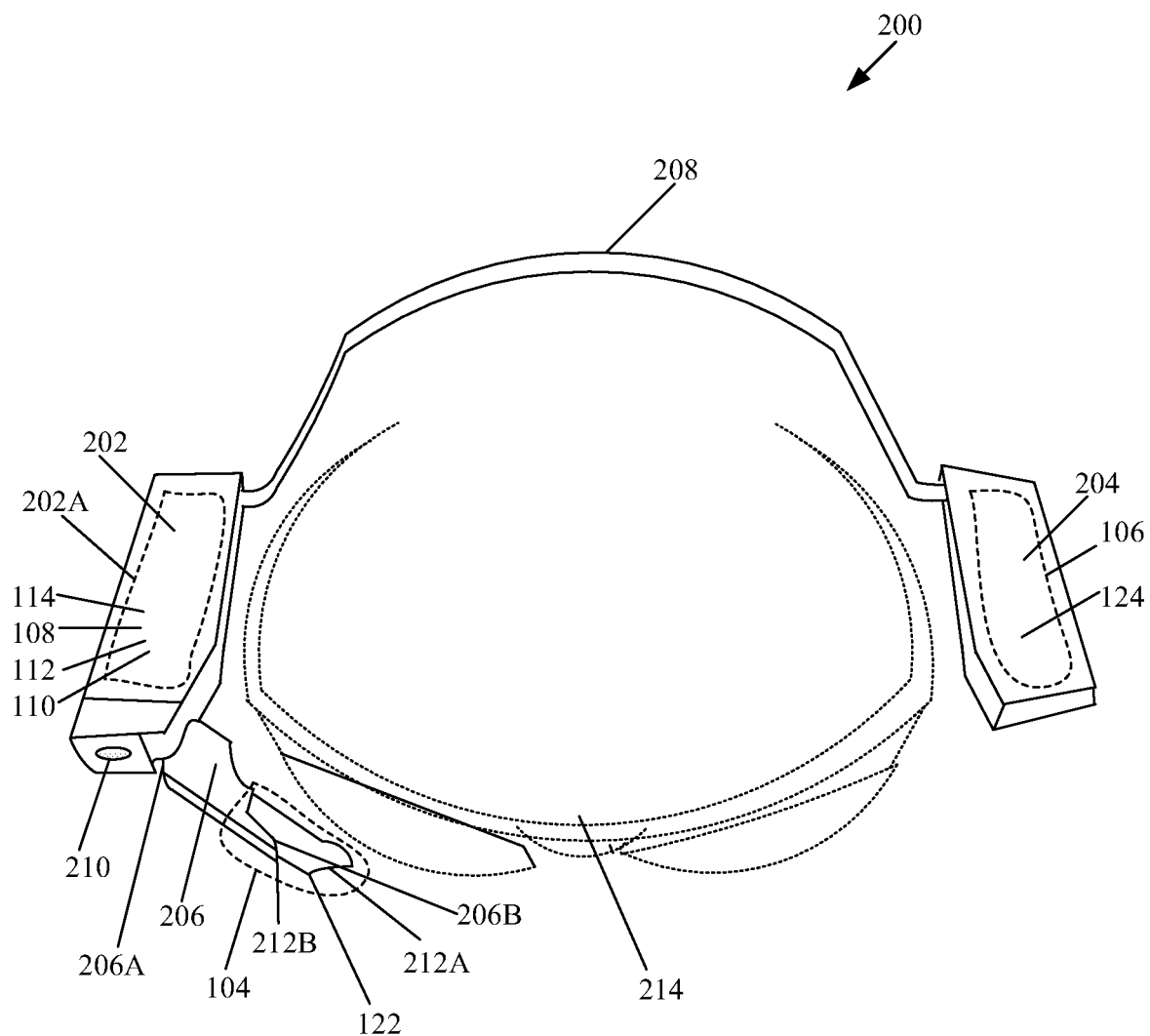
FIG. 2 illustrates a first exemplary HMD device with a protective system, in accordance with an embodiment of the disclosure.

FIG. 2 illustrates a first exemplary HMD device with a protective system, in accordance with an embodiment of the disclosure. FIG. 2 is explained in conjunction with elements from FIG. 1. With reference to FIG. 2, there is shown a first HMD device 200 as an example of the HMD device 100. The first HMD device 200 may be a near-to-eye device worn on the head of a human or over conventional eyeglasses including goggles and sunglasses. The first HMD device 200 when attached to a conventional or a personal eyeglass, such as an eyeglass 214, transforms the eyeglass 214 to a smart glass or a smart display device. The first HMD device 200 may include a first housing 202 that encloses a control board 202A. The control board 202A may include the processor 114, the plurality of sensors 108 (e.g., a sensor hub), the memory 110, and network interface 112. The network interface 112 may support WLAN, Bluetooth, or other wireless communication protocols. The first housing 202 also encloses a ToF camera 210. The ToF camera 210 may be at least one of the plurality of sensors 108 that provides sensor input to the processor 114. The processor 114 may be configured to utilize the ToF camera 210 to compute the distance between a moving object, such as a ball or other moving objects, and the HMD device 100 when a flight of the moving object indicates a likelihood of a potential hit (or impact) with HMD device 100.

The first HMD device 200 may further include a second housing 204 that encloses the power system 106 (which includes the battery 124). The first housing 202 may be connected to the second housing 204 via a connector 208. The connector 208 may be a curved strip or band of flexible material to enable the first HMD device 200 to be worn around the human head or over the eyeglass 214 as the near-to-eye device, as shown in an example. The first HMD device 200 may further include a third housing 206 having a first end 206A (e.g., a connector end) and a second end 206B (i.e., a terminal end). The first end 206A of the third housing 206 may be coupled to the first housing 202. The second end 206B may provide support to the optical unit 122 that protrudes from the second end 206B. The optical unit 122 may include a prism 212A, which in association with the micro-display 120 provided in the third housing 206 enable a view to be presented to a viewer. The prism 212A may be a prismatic reflective surface that reflects projected light towards at least an eye of a viewer.

In accordance with an embodiment, one or more components of the protective system 102 may be mounted within the third housing 206. In some embodiments, one or more components, such as the actuator 116 and the plurality of protective mechanisms 118, of the protective system 102 may be distributed within the first housing 202, the third housing 206, or a joining portion of the first housing 202 and the first end 206A of the third housing 206. In one example, the customized or miniaturized airbag, the tubular structure may be provided within the third housing 206. In another example, the retract mechanism may be provided within the first housing 202 and the detachment mechanism may be positioned at the provided in the joining portion of the first housing 202 and the first end 206A of the third housing 206.

Figure 3:
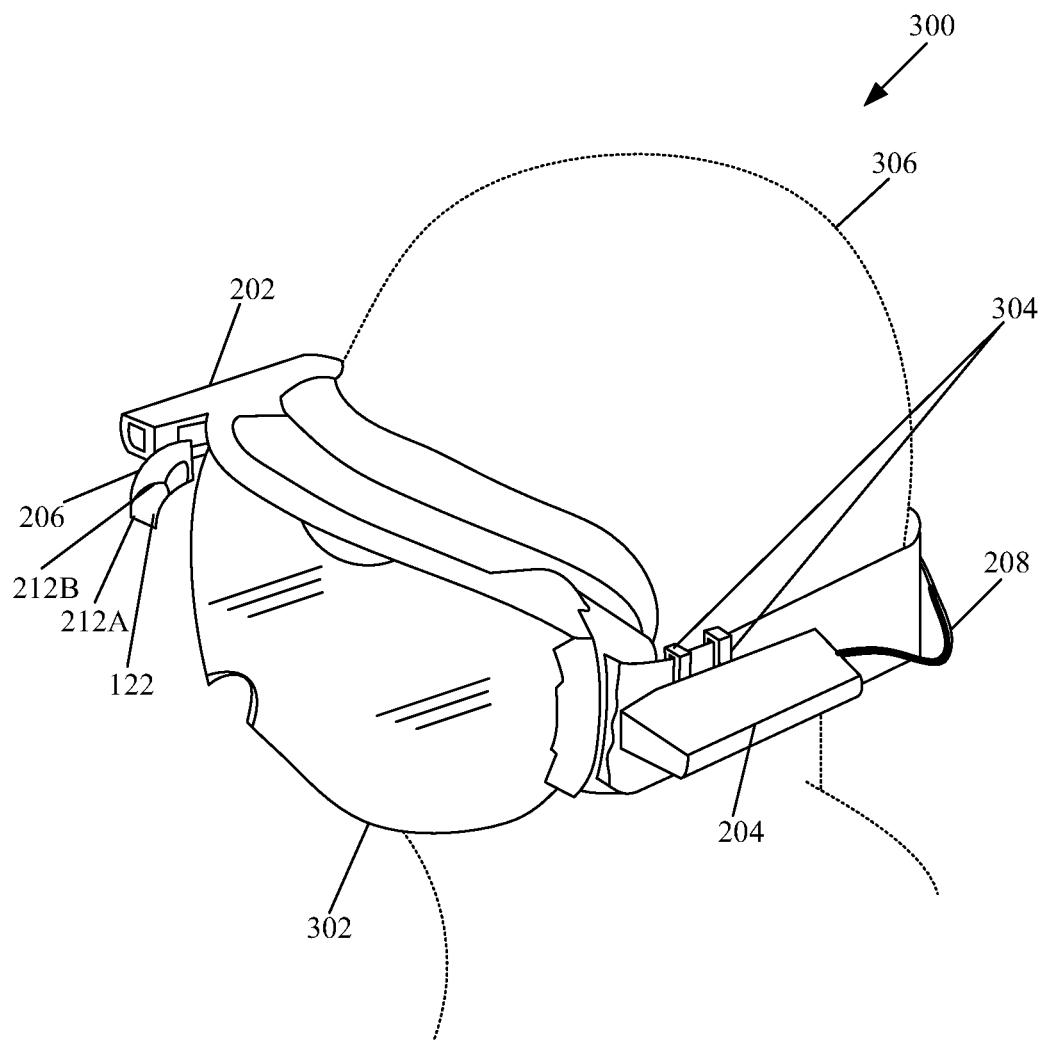
FIG. 3 illustrates a second exemplary HMD device with a protective system, in accordance with an embodiment of the disclosure.

FIG. 3 illustrates a second exemplary HMD device with a protective system, in accordance with an embodiment of the disclosure. FIG. 3 is explained in conjunction with elements from FIGS. 1 and 2. With reference to FIG. 3, there is shown a second HMD device 300 as an example of the HMD device 100. The first HMD device 200 may be another near-to-eye device that may be removably attached to various platforms, such as eyeglasses or other head mounted sportswear, such as a head mounted sportswear 302. The second HMD device 300 when attached to the head mounted sportswear 302 worn by a user 306 transforms the head mounted sportswear 302 to a smart glass or a smart display device. The second HMD device 300 may include a plurality of attachment clips 304 that provides a grip and removably attaches at least at portion of the second HMD device 300 to the head mounted sportswear 302. In some embodiments, one or more attachment clips, such as the plurality of attachment clips 304, may be detachably affixed to the first housing 202 and the second housing 204. Other components of the second HMD device 300 may be similar to that of the components of the first HMD device 200, discussed in FIG. 2 as well as in FIG. 1.

Figure 4:
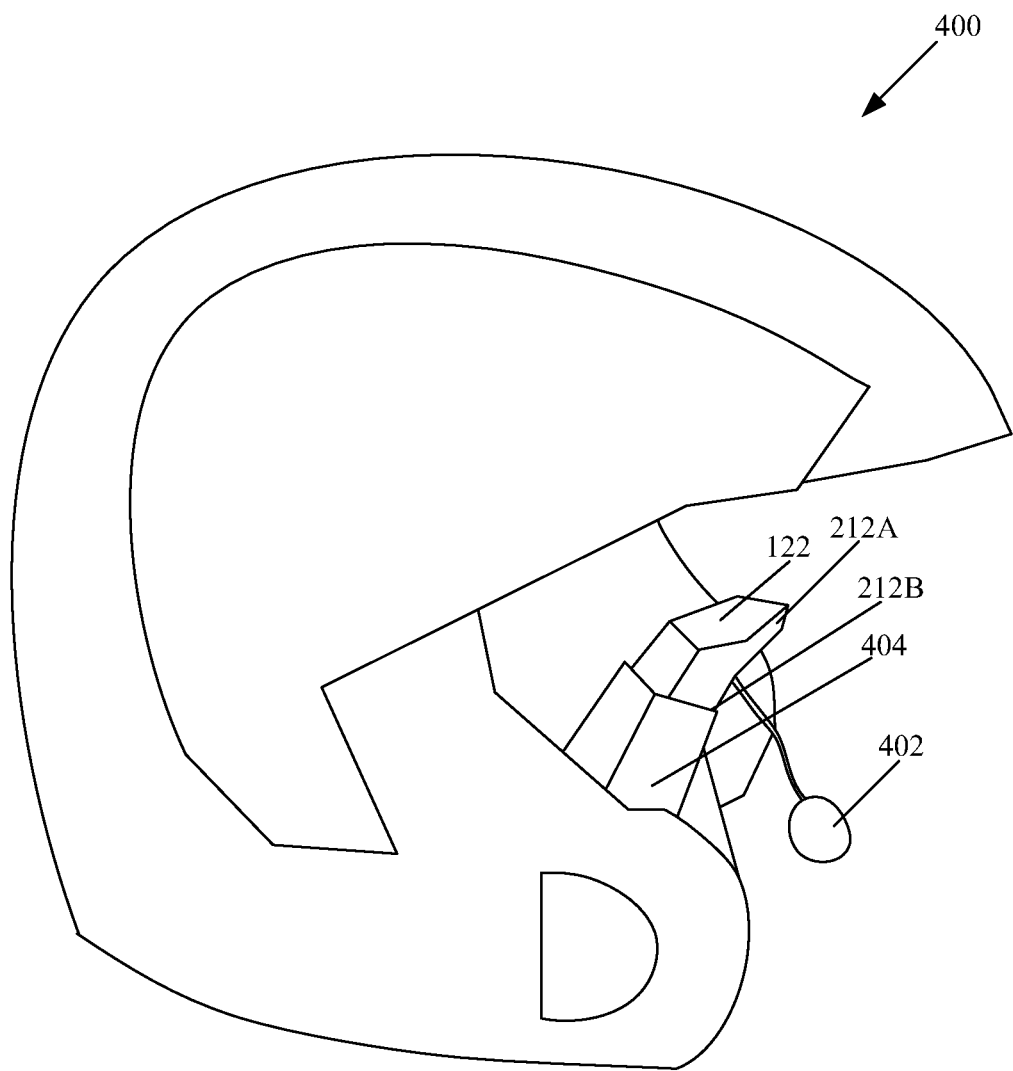
FIG. 4 illustrates a third exemplary HMD device with a protective system, in accordance with an embodiment of the disclosure.

FIG. 4 illustrates a third exemplary HMD device with a protective system, in accordance with an embodiment of the disclosure. FIG. 4 is explained in conjunction with elements from FIGS. 1, 2, and 3. With reference to FIG. 4, there is shown a third HMD device 400 as an example of the HMD device 100. The third HMD device 400 may be a wearable display device that may be detachable affixed to various platforms, such as a protective headgear or a helmet. The third HMD device 400 as a part of the helmet may find application in various sports that require using helmets or some form of protective headgear. Example of such sports may include, but is not limited to baseball, rugby, ice hockey, cycling, skiing, horse racing, cricket, biking, skateboarding, inline skating, camogie, or Lacrosse. In some embodiments, instead of having multiple housings, such as the first housing 202, the second housing 204, and the third housing 206 (FIG. 2), various components of the HMD device 100 may be included in a single housing, such as a housing 404, in the third HMD device 400, as shown in an example. There is also shown a microphone 402 that may be configured to receive voice input from the wearer of the third HMD device 400.

Figure 5:
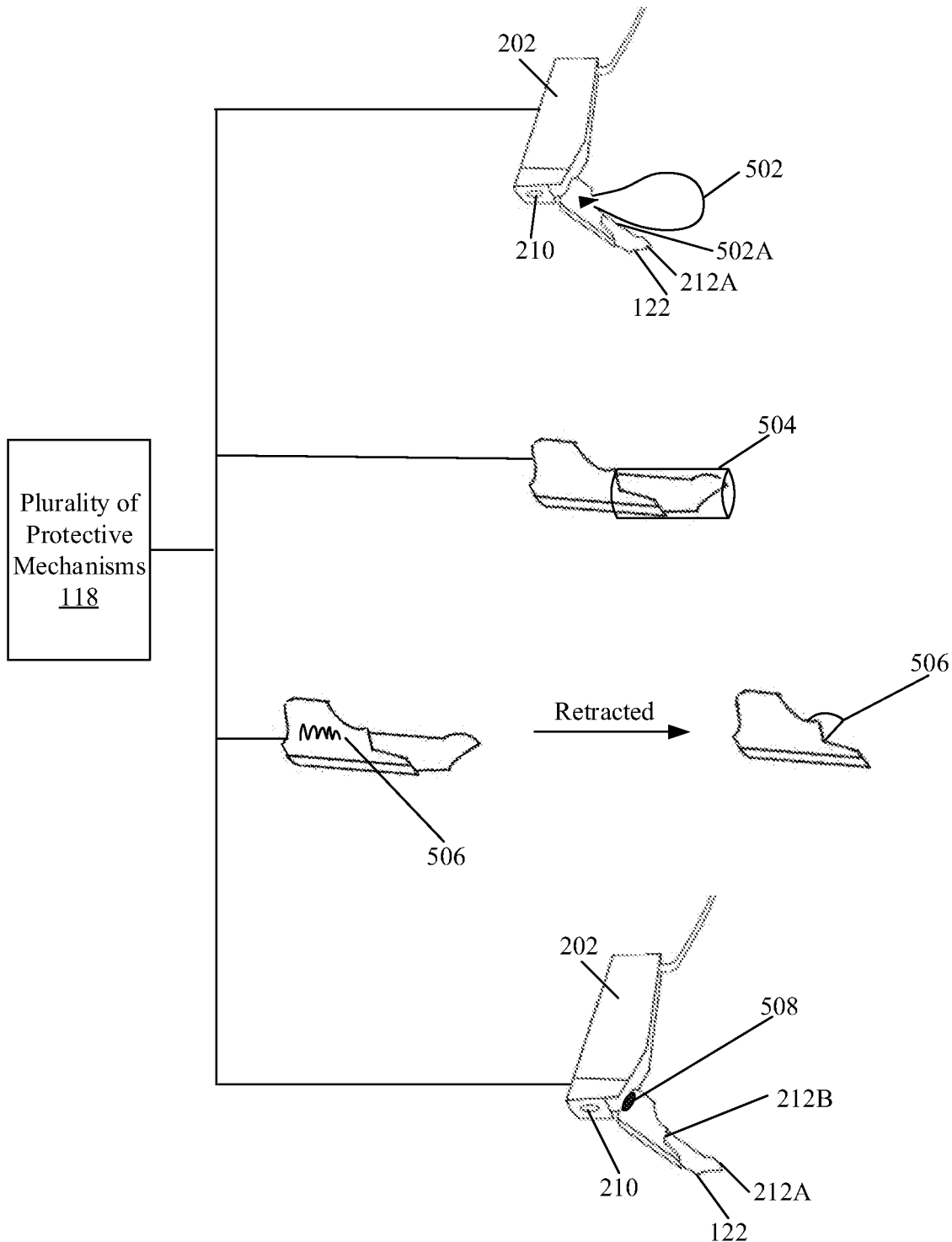
FIG. 5 illustrates a plurality of protective mechanisms of the exemplary HMD device of FIG. 1, in accordance with an embodiment of the disclosure.

FIG. 5 illustrates a plurality of protective mechanisms of the exemplary HMD device of FIG. 1, in accordance with an embodiment of the disclosure. FIG. 5 is explained in conjunction with elements from FIGS. 1, 2, 3, and 4. With reference to FIG. 5, there is shown the plurality of protective mechanisms 118. The plurality of protective mechanisms 118 may include a customized airbag 502, a tubular structure 504, a retract mechanism 506, and a detachment mechanism 508.

The customized airbag 502 may be an inflatable airbag specially designed to be inflated to cover at least an inner face 502A of the optical unit 122 of the HMD device 100, (as shown for example in FIG. 5) based on an airbag deploy signal received from the processor 114. The inner face 502A of the optical unit 122 faces at least one eye of a wearer of the HMD device 100. The processor 114 may be configured to control the actuator 116 to deploy the customized airbag 502 to mitigate injury to the user from one or more components, such as the optical unit 122, of the HMD device 100. The processor 114 may be configured to control the actuator 116 to deploy the customized airbag 502, based on the identified situational state and the determined risk-level, as discussed for example in FIG. 1.

The tubular structure 504 may be made of a polymeric material, such as plastic, rubber, or other material suitable to cover one or more components, such as the optical unit 122, of the HMD device 100. In some embodiments, the tubular structure 504 may be mounted within the third housing 206 in a compressed state (or folded state). The processor 114 may be configured to control the actuator 116 to deploy the tubular structure 504 in an extended state to encompass the optical unit 122 of the HMD device 100 to mitigate injury to the user from the optical unit 122 based on a tubular structure deploy signal received from the processor 114. In some embodiments, the tubular structure 504 may be mounted within the first housing 202 in a compressed state (or folded state). In such embodiments, the tubular structure 504 may encompass the first housing 202 including the optical unit 122 of the HMD device 100 when deployed.

The retract mechanism 506 may be mounted within the third housing 206. In accordance with an embodiment, the retract mechanism 506 may be a spring-like mechanism that is capable of retraction and extension of one or more components, such as the optical unit 122, of the HMD device 100 based on a retract mechanism deploy signal received from the processor 114. The processor 114 may be configured to control the actuator 116 to retract the one or more components, such as the optical unit 122, of the HMD device 100 using the retract mechanism 506 to mitigate a potential injury to a user from the one or more components, such as the optical unit 122, of the HMD device 100. In some embodiments, the retract mechanism 506 may be mounted within the first housing 202. In such embodiments, the third housing 206 may be retracted within the first housing 202. In accordance with an embodiment, the processor 114 may be configured to control the actuator 116 to extend the retracted component based on user input or based on the identified situational state and the determined risk-level as no risk.

The detachment mechanism 508 may be a detachable joint between the first housing 202 and the first end 206A of the third housing 206. The processor 114 may be configured to control the actuator 116 to detach one or more components, such as the third housing 206, from the HMD device 100 by the detachment mechanism 508 to mitigate injury to a user from the one or more components, such as the optical unit 122, of the HMD device 100, based on the identified situational state and the determined risk-level.

Figure 6:
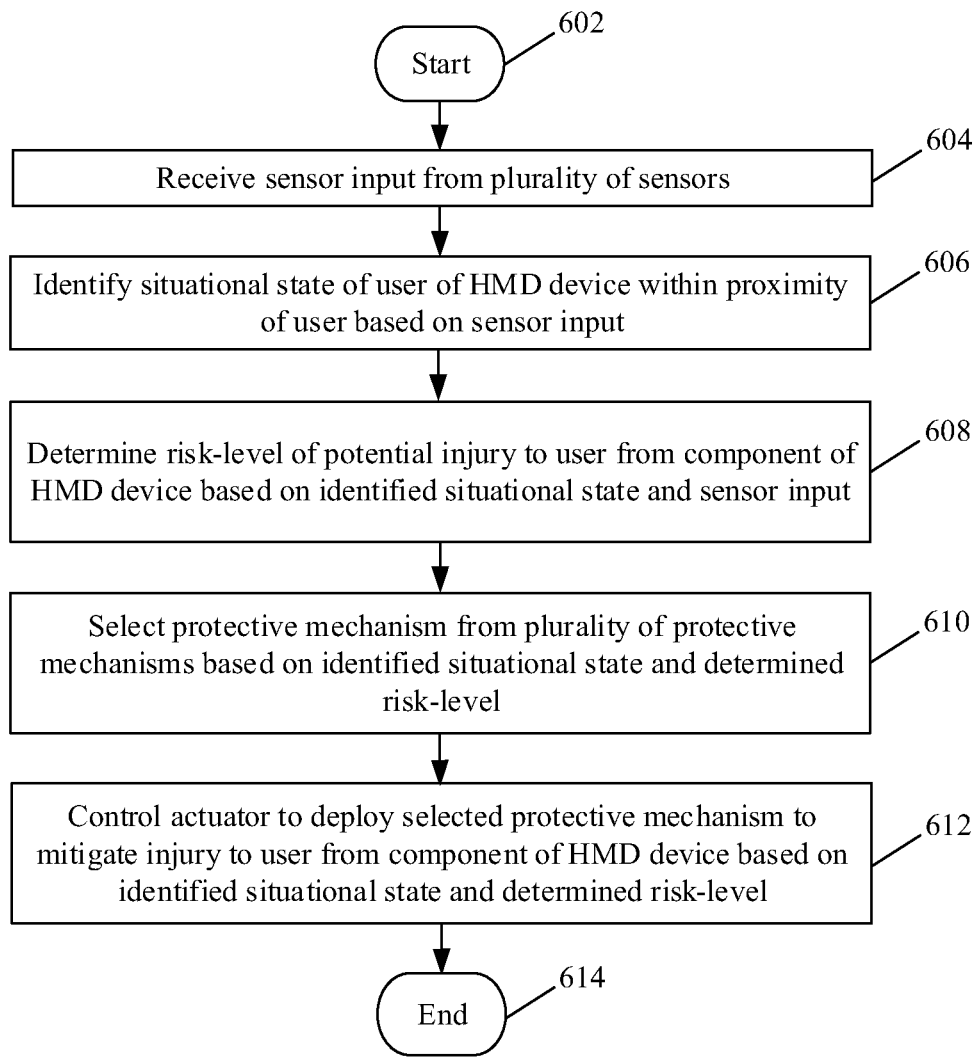
FIG. 6 is a first flow chart that illustrates exemplary operations in the exemplary HMD device of FIG. 1, for protection of the HMD device and a wearer of the HMD device, in accordance with an embodiment of the disclosure.

FIG. 6 is a flow chart that illustrates exemplary operations in the exemplary HMD device of FIG. 1, for protection of the HMD device and a wearer of the HMD device, in accordance with an embodiment of the disclosure. FIG. 6 is described in conjunction with elements from FIGS. 1 to 5. With reference to FIG. 6, there is shown a flowchart that starts at 602 and proceeds to 604.

At 604, sensor input from the plurality of sensors 108 may be received. At 606, a situational state of a user of the HMD device within a proximity of the user, may be identified based on the received sensor input. The processor 114 may be configured to receive the sensor input from the plurality of sensors 108. An example of at least one sensor of the plurality of sensors 108 may be the ToF camera 210 (FIG. 2).

At 606, a situational state of a user of the HMD device 100 within a proximity of the user, may be identified based on the received sensor input. The processor 114 may be configured to identify the situational state of a user of the HMD device 100 (e.g., the first HMD device 200, the second HMD device 300, or the third HMD device 400) within a defined proximity range of the user. The situational state indicates what is going-on near the user who may be wearing the HMD device 100 and current activities of the user. Example of current activities may include, but are not limited to running, walking, playing a sport, a falling state, an impact from an external object, or a physically idle state.

At 608, a risk-level of a potential injury to the user from a component of the HMD device 100 may be determined based on the identified situational state and the sensor input. The processor 114 may be configured to determine the risk-level of the potential injury to the user from a component of the HMD device 100 based on the identified situational state and the sensor input. In some embodiments, the component of the HMD device 100 may be an optical unit, such as the optical unit 122, positioned to face at least one eye of the user.

At 610, a protective mechanism may be selected from the plurality of protective mechanisms 118 based on the identified situational state and the determined risk-level. The processor 114 may be configured to select a particular protective mechanism from the plurality of protective mechanisms 118 based on the identified situational state and the determined risk-level. The plurality of protective mechanisms 118 have been shown and described, for example, in FIG. 5.

At 612, an actuator (e.g., the actuator 116) may be controlled to deploy the selected protective mechanism to mitigate injury to the user from the component of the HMD device, based on the identified situational state and the determined risk-level. In accordance with an embodiment, the processor 114 may be configured to determine, whether to output a warning signal or control the actuator (e.g., the actuator 116) to deploy the selected protective mechanism, based on the computed distance between the moving object and the HMD device and the likelihood of the contact of the moving object with the HMD device 100.

Figure 7A:
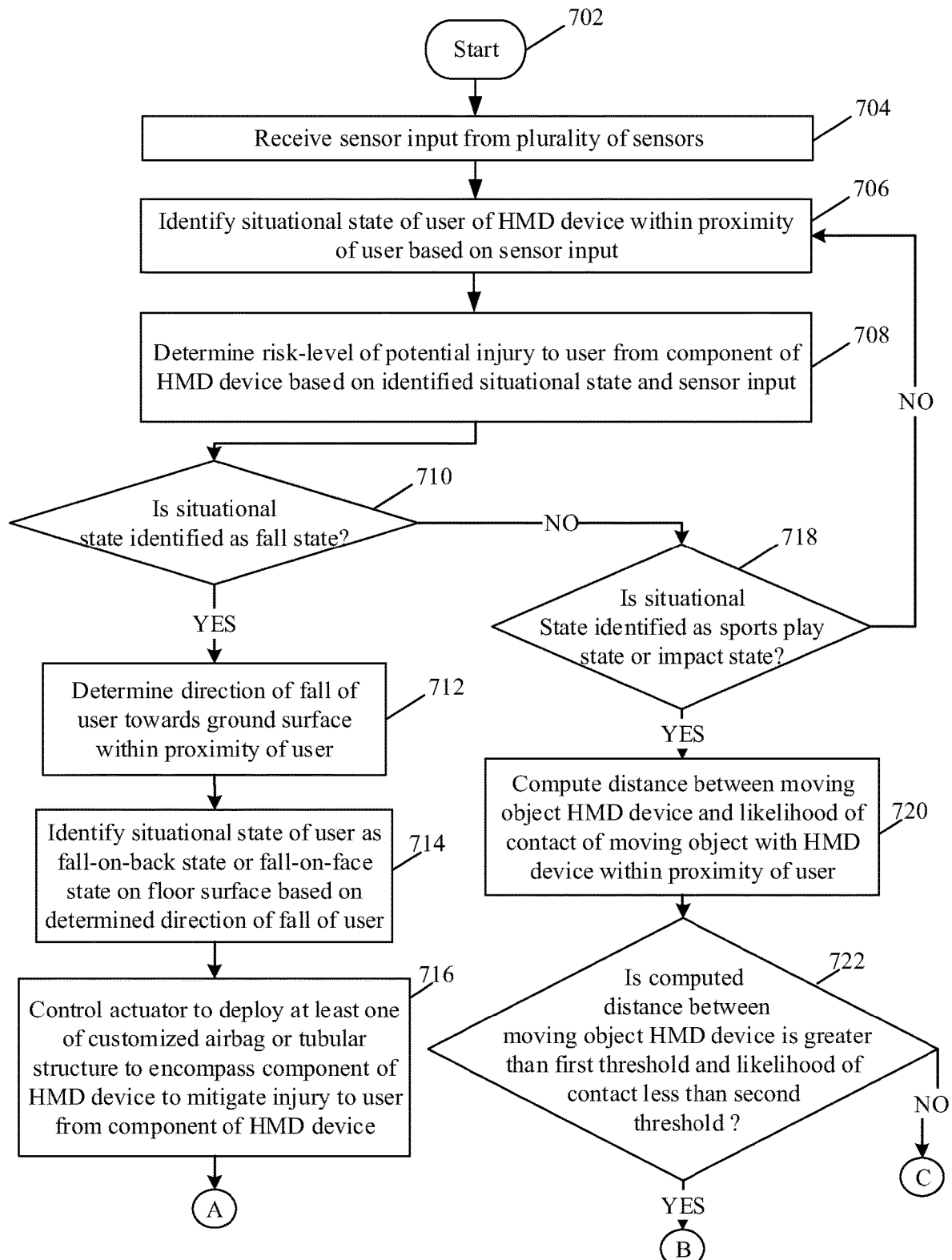
FIGS. 7A and 7B, collectively depict a flow chart that illustrates exemplary operations in the exemplary HMD device of FIG. 1, for protection of the HMD device and a wearer of the HMD device, in accordance with an embodiment of the disclosure.
Figure 7B:
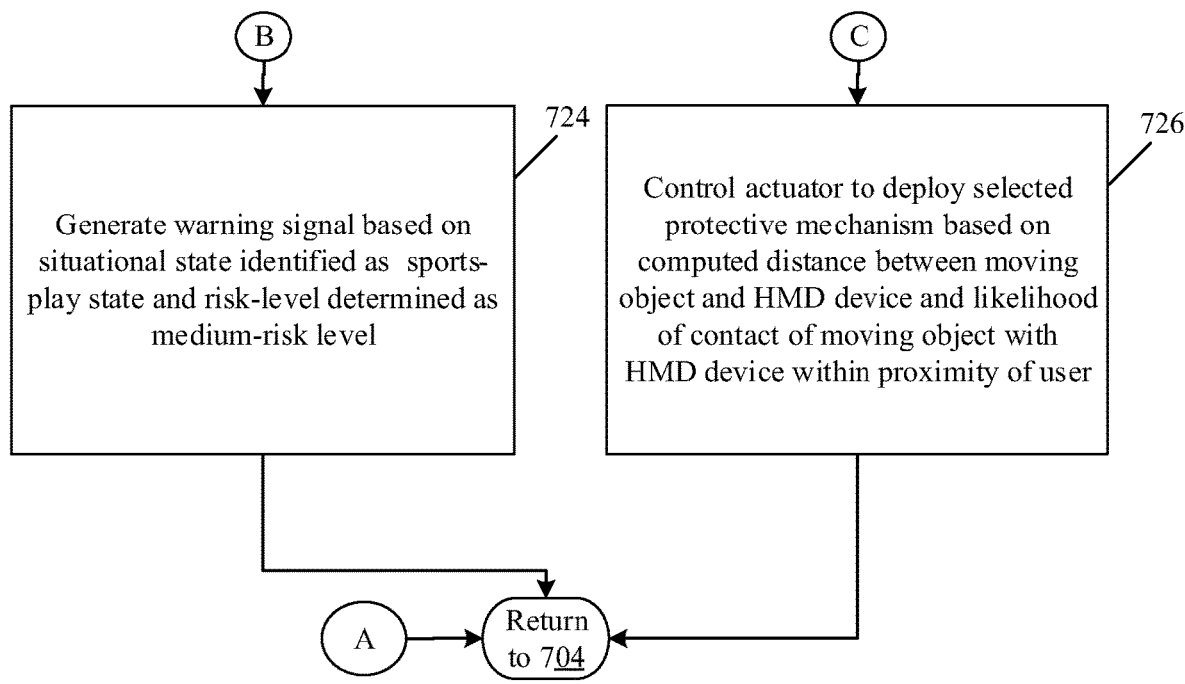

FIGS. 7A and 7B, collectively depict a flow chart that illustrates exemplary operations in the exemplary HMD device of FIG. 1, for protection of the HMD device and a wearer of the HMD device, in accordance with an embodiment of the disclosure. FIGS. 7A and 7B are described in conjunction with elements from FIGS. 1 to 5. With reference to FIGS. 7A and 7B, there is shown a flowchart that starts at 702 and proceeds to 704.

At 704, sensor input from the plurality of sensors 108 may be received. The processor 114 may be configured to receive the sensor input from the plurality of sensors 108. At 706, a situational state of a user of the HMD device within a proximity of the user, may be identified based on the received sensor input. The processor 114 may be configured to identify the situational state of a user of the HMD device 100 within a defined proximity range of the user.

At 708, a risk-level of a potential injury to the user from a component of the HMD device may be determined based on the identified situational state and the sensor input. The processor 114 may be configured to determine the risk-level of the potential injury to the user from a component (e.g., the optical unit 122) of the HMD device 100 based on the identified situational state and the sensor input. At 710, it may be determined whether the situational state of the user is identified as fall state. In cases where the situational state of the user is identified as fall state, the control passes to 712. In cases where the situational state of the user is not identified as fall state, then the control passes to 718.

At 712, a direction of fall of the user towards a ground surface within the proximity of the user may be determined. The processor 114 may be configured to determine the direction of fall of the user towards the ground surface within the proximity of the user. At 714, the situational state of the user may be identified as a fall-on-back state or a fall-on-face state on the floor surface, based on the determined direction of fall of the user. The processor 114 may be configured to determine the situational state as the fall-on-back state or the fall-on-face state.

At 716, the actuator 116 may be controlled to deploy at least one of the customized airbag 502 or the tubular structure 504 that encompasses the component of the HMD device 100 to mitigate injury to the user from the component of the HMD device 100. The processor 114 may be configured to control the actuator 116 to deploy at least one of the customized airbag 502 or the tubular structure 504 that encompasses the component of the HMD device 100. In accordance with an embodiment, the customized airbag 502 or the tubular structure 504 may be deployed based on the identification of the situational state as the fall-on-face state and the risk-level as a high risk-level greater than a threshold.

At 718, it may be determined whether the situational state of the user is identified as a sports play state or an impact state. The processor 114 may be configured to determine whether the situational state of the user is identified as the sports play state or the impact state. The impact state indicates a potential impact from an external moving object moving towards the HMD device 100.

At 720, a distance between a moving object and the HMD device 100 and a likelihood of a contact of the moving object with the HMD device 100, within the proximity of the user may be computed. The processor 114 may be configured to compute the distance between the moving object and the HMD device 100 and the likelihood of the contact of the moving object with the HMD device 100.

At 722, it may be determined whether the computed distance between the moving object and the HMD device is greater than a first threshold and the likelihood of the contact of the moving object with the HMD device is less than a second threshold. In cases where the computed distance between the moving object and the HMD device is greater than the first threshold and the likelihood of the contact of the moving object with the HMD device is less than the second threshold, the control passes to 724, else to 726.

At 724, a warning signal may be generated further based on the situational state identified as the sports-play state and the risk-level determined as a medium-risk level. The risk-level may be determined as the medium-risk level based on a comparison of the computed distance and the likelihood of the contact of the moving object with the HMD device with one or more defined thresholds (e.g., the first threshold for the computed distance and the second threshold for the likelihood). The processor 114 may be configured to generate the warning signal based on the situational state identified as the sports-play state and the risk-level determined as the medium-risk level.

At 726, an actuator, such as the actuator 116, may be controlled to deploy a selected protective mechanism to mitigate injury to the user from the component of the HMD device 100, based on the identified situational state and the determined risk-level. The selection of the protective mechanism from the plurality of protective mechanisms 118 may be based on the identified situational state and the determined risk-level. The processor 114 may be configured to control the actuator, such as the actuator 116, to deploy a selected protective mechanism to mitigate injury to the user from the component of the HMD device 100. The control may return to 604.

Various embodiments of the disclosure may provide a non-transitory, computer-readable medium and/or storage medium, and/or a non-transitory machine readable medium and/or storage medium stored thereon, a set of instructions executable by a machine and/or a computer to perform operations that comprise identifying a situational state of a user of the HMD device (e.g., the HMD device 100, 200, 300, or 400) within a proximity of the user, based on sensor input received from a plurality of sensors communicatively coupled to the protective system. A risk-level of a potential injury to the user may be determined from a component of the HMD device, based on the identified situational state and the sensor input. A protective mechanism may be selected from a plurality of protective mechanisms provided in the protective system, based on the identified situational state and the determined risk-level. An actuator of the protective system may be controlled to deploy the selected protective mechanism to mitigate injury to the user from the component of the HMD device, based on the identified situational state and the determined risk-level.

Various implementations may include one or more of the following features. The HMD device, where the plurality of protective mechanisms includes a retract mechanism, where the processor may be configured to control the actuator to retract the component of the HMD device by the retract mechanism to mitigate injury to the user from the component of the HMD device, based on the identified situational state and the determined risk-level. The HMD device, where the plurality of protective mechanisms includes a customized airbag, where the processor may be configured to control the actuator to deploy the customized airbag to mitigate injury to the user from the component of the HMD device, based on the identified situational state and the determined risk-level. The HMD device, where the plurality of protective mechanisms includes a tubular structure, where the processor may be configured to control the actuator to deploy the tubular structure to encompass the component of the HMD device to mitigate injury to the user from the component of the HMD device, based on the identified situational state and the determined risk-level. The HMD device, where the plurality of protective mechanisms includes a detachment mechanism, where the processor may be configured to control the actuator to detach the component from the HMD device by the detachment mechanism to mitigate injury to the user from the component of the HMD device, based on the identified situational state and the determined risk-level. The HMD device, where the processor may be further configured to determine a direction of fall of the user towards a ground surface within the proximity of the user. The HMD device, where the processor may be further configured to identify the situational state of the user as a fall-on-back state or a fall-on-face state on the floor surface, based on the determined direction of fall of the user. The HMD device, where the plurality of protective mechanisms include at least one of a customized airbag or a tubular structure, where the processor may be configured to control the actuator to deploy at least one of the customized airbag or the tubular structure to encompass the component of the HMD device to mitigate injury to the user from the component of the HMD device, based on the identification of the situational state as the fall-on-face state and the risk-level as a high risk-level greater than a threshold. The HMD device, where the processor may be configured to compute a distance between a moving object and the HMD device and a likelihood of a contact of the moving object with the HMD device, within the proximity of the user. The HMD device, where the processor may be further configured to determine, whether to output a warning signal or control the actuator to deploy the selected protective mechanism, based on the computed distance between the moving object and the HMD device and the likelihood of the contact of the moving object with the HMD device. The HMD device, where the warning signal may be generated further based on the situational state identified as a sports-play state and the risk-level determined as a medium-risk level, where the risk-level may be determined as a medium-risk level based on a comparison of the computed distance and the likelihood of the contact of the moving object with the HMD device with one or more defined thresholds. The HMD device, where the component of the HMD device corresponds to an optical unit positioned to face at least one eye of the user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A head mounted display (HMD) device, comprising:
a plurality of sensors configured to output a sensor input;
an actuator;
a plurality of protective mechanisms; and
a processor configured to:
identify a situational state of a user of the HMD device based on the sensor input received from the plurality of sensors;
determine a risk-level of a potential injury to the user based on the identified situational state and the sensor input, wherein the risk-level corresponds to a risk associated with the user from a component of the HMD device;
select a protective mechanism from the plurality of protective mechanisms based on the identified situational state and the determined risk-level; and
control the actuator to deploy the selected protective mechanism to mitigate injury to the user from the component of the HMD device, wherein the actuator is controlled based on the identified situational state and the determined risk-level.

2. The HMD device according to claim 1, wherein
the plurality of protective mechanisms includes a retract mechanism,
the processor is further configured to control the actuator to retract the component of the HMD device by the retract mechanism to mitigate injury to the user from the component of the HMD device, and
the actuator is controlled based on the identified situational state and the determined risk-level.

3. The HMD device according to claim 1, wherein
the plurality of protective mechanisms includes a customized airbag,
the processor is further configured to control the actuator to deploy the customized airbag to mitigate injury to the user from the component of the HMD device, and
the actuator is controlled based on the identified situational state and the determined risk-level.

4. The HMD device according to claim 1, wherein
the plurality of protective mechanisms includes a tubular structure,
the processor is further configured to control the actuator to deploy the tubular structure to encompass the component of the HMD device to mitigate injury to the user from the component of the HMD device, and
the actuator is controlled based on the identified situational state and the determined risk-level.

5. The HMD device according to claim 1, wherein
the plurality of protective mechanisms includes a detachment mechanism, and
the processor is further configured to control the actuator to detach the component from the HMD device by the detachment mechanism to mitigate injury to the user from the component of the HMD device, based on the identified situational state and the determined risk-level.

6. The HMD device according to claim 1, wherein the processor is further configured to determine a direction of fall of the user towards a ground surface within a proximity of the user.

7. The HMD device according to claim 6, wherein the processor is further configured to identify the situational state of the user as a fall-on-back state or a fall-on-face state on the ground surface, based on the determined direction of fall of the user.

8. The HMD device according to claim 7, wherein
the plurality of protective mechanisms include at least one of a customized airbag or a tubular structure,
the processor is further configured to control the actuator to deploy at least one of the customized airbag or the tubular structure to encompass the component of the HMD device to mitigate injury to the user from the component of the HMD device, and
the actuator is controlled based on the identification of the situational state as the fall-on-face state and the risk-level as a high risk-level greater than a threshold.

9. The HMD device according to claim 1, wherein the processor is further configured to compute a distance between a moving object and the HMD device and a likelihood of a contact of the moving object with the HMD device within a proximity of the user.

10. The HMD device according to claim 9, wherein the processor is further configured to determine, whether to output a warning signal or control the actuator to deploy the selected protective mechanism, based on the computed distance between the moving object and the HMD device and the likelihood of the contact of the moving object with the HMD device.

11. The HMD device according to claim 10, wherein
the processor is further configured to:
identify the situational state as a sports-play state; and generate the warning signal based on the situational state identified as the sports-play state and the risk-level determined as a medium-risk level, and the risk-level is determined as the medium-risk level based on a comparison of the computed distance and the likelihood of the contact of the moving object with the HMD device with one or more defined thresholds.

12. The HMD device according to claim 1, wherein the component of the HMD device corresponds to an optical unit that faces at least one eye of the user.

13. A protective system for a head mounted display (HMD) device, the protective system comprising:
    an actuator;
    a plurality of protective mechanisms; and
    a processor configured to:
        identify a situational state of a user of the HMD device, based on a sensor input received from a plurality of sensors;
        determine a risk-level of a potential injury to the user, based on the identified situational state and the sensor input, wherein the risk-level corresponds to a risk associated with the user from a component of the HMD device;
        select a protective mechanism from the plurality of protective mechanisms based on the identified situational state and the determined risk-level; and
        control the actuator to deploy the selected protective mechanism to mitigate injury to the user from the component of the HMD device.

14. A method for a head mounted display (HMD) device, the method comprising:
    in a protective system of the HMD device:
        identifying a situational state of a user of the HMD device, based on a sensor input received from a plurality of sensors communicatively coupled to the protective system;
        determining a risk-level of a potential injury to the user, based on the identified situational state and the sensor input, wherein the risk-level corresponds to a risk associated with the user from a component of the HMD device;
        selecting a protective mechanism from a plurality of protective mechanisms provided in the protective system, based on the identified situational state and the determined risk-level; and
        controlling an actuator of the protective system to deploy the selected protective mechanism to mitigate injury to the user from the component of the HMD device, wherein the selected protective mechanism is deployed based on the identified situational state and the determined risk-level.

15. The method according to claim 14, further comprising controlling the actuator to retract the component of the HMD device by a retract mechanism to mitigate injury to the user from the component of the HMD device, wherein
    the actuator is controlled based on the identified situational state and the determined risk-level, and
    the plurality of protective mechanisms includes the retract mechanism.

16. The method according to claim 14, further comprising controlling the actuator to deploy a customized airbag to mitigate injury to the user from the component of the HMD device, wherein
    the actuator is controlled based on the identified situational state and the determined risk-level, and
    the plurality of protective mechanisms includes the customized airbag.

17. The method according to claim 14, further comprising controlling the actuator to deploy a tubular structure to encompass the component of the HMD device to mitigate injury to the user from the component of the HMD device, wherein
    the actuator is controlled based on the identified situational state and the determined risk-level, and
    the plurality of protective mechanisms includes the tubular structure.

18. The method according to claim 14, further comprising controlling the actuator to detach the component from the HMD device by a detachment mechanism to mitigate injury to the user from the component of the HMD device, wherein the actuator is controlled based on the identified situational state and the determined risk-level, and the plurality of protective mechanisms includes the detachment mechanism.

19. The method according to claim 14, further comprising determining a direction of fall of the user towards a ground surface.

20. The method according to claim 19, further comprising controlling the actuator to deploy at least one of a customized airbag or a tubular structure to encompass the component of the HMD device to mitigate injury to the user from the component of the HMD device, wherein
    the actuator is controlled based on the determined direction of fall of the user, and
    the plurality of protective mechanisms includes at least one of the customized airbag or the tubular structure.

* * * * *